United States Patent [19]

Kunda et al.

[11] Patent Number: 5,162,106
[45] Date of Patent: Nov. 10, 1992

[54] PHOTOGRAPHIC FIXER REGENERATION

[75] Inventors: Wasyl Kunda; Thomas H. Etsell, both of Edmonton, Canada

[73] Assignee: The Governors of the University of Alberta, Edmonton, Canada

[21] Appl. No.: 856,812

[22] Filed: Mar. 24, 1992

Related U.S. Application Data

[63] Continuation of Ser. No. 641,686, Jan. 16, 1991, which is a continuation-in-part of Ser. No. 514,936, Apr. 26, 1990, abandoned.

[30] Foreign Application Priority Data

Oct. 12, 1989 [CA] Canada .................................. 2000527

[51] Int. Cl.$^5$ ............................................. C01B 17/00
[52] U.S. Cl. .................... 423/511; 423/561.1; 423/37; 430/398; 430/400; 430/455
[58] Field of Search ................ 423/37, 47, 511, 561.1; 430/398, 400, 455; 75/713

[56] References Cited

U.S. PATENT DOCUMENTS

| | | |
|---|---|---|
| 483,972 | 10/1892 | Whitehead . |
| 1,446,405 | 2/1923 | Thomas . |
| 1,527,942 | 2/1925 | Weisberg . |
| 2,748,000 | 5/1956 | Mader ........................ 95/88 |
| 3,082,079 | 3/1963 | Bulloch et al. ............... 95/108 |
| 3,634,088 | 1/1972 | Colley ........................ 96/60 BF |
| 3,709,660 | 6/1973 | Urban ........................ 423/566 |
| 3,825,425 | 7/1974 | Heilmann ..................... 96/60 R |
| 3,832,453 | 8/1974 | Slovonsky .................... 423/561 |
| 3,907,568 | 9/1975 | Shirasu et al. ................ 96/60 BF |
| 4,127,639 | 11/1978 | Piret ........................ 423/42 |
| 4,755,453 | 7/1988 | Kunda ........................ 430/398 |
| 5,055,382 | 10/1991 | Long et al. .................. 430/400 |
| 5,085,836 | 2/1992 | Booker ....................... 423/34 |

FOREIGN PATENT DOCUMENTS

| | | |
|---|---|---|
| 75373 | 2/1919 | Fed. Rep. of Germany . |
| 354295 | 6/1922 | Fed. Rep. of Germany . |
| 385477 | 12/1923 | Fed. Rep. of Germany . |
| 203486 | 6/1939 | Fed. Rep. of Germany . |
| 2331220 | 1/1974 | Fed. Rep. of Germany . |
| 3718583A1 | 12/1988 | Fed. Rep. of Germany . |
| 53-57027 | 7/1978 | Japan . |
| 54-2848 | 2/1979 | Japan ........................ 430/398 |
| 63-45121 | 2/1988 | Japan ........................ 423/37 |

OTHER PUBLICATIONS

Morana, "Silver Recovery From Waste of Film by Burning", Precious Metals, 1981, pp. 369-377.
Holleman, "Lehrbuch Der Anorganischen Chemie", 1971, p. 288.
"Effective Competing Equilibria On The Solubility of Precipitates," pp. 101-102.
Patent Abstracts of Japan, vol. 12, No. 258.
"Recovering Silver From Photographic Materials," No. J-10, 1972.
W. Kunda, "Processing of Photographic Spent Solution by Chemical Method," Jun., 1983.
Chemical Abstracts, 109(26)240579h Oct. 31, 1987.
Chemical Abstracts 109(16)132602b Dec. 15, 1986.
Chemical Abstracts 109(7)53943k Feb. 1988.
Chemical Abstracts 106(22)186253v Dec. 1986.
Chemical Abstracts 102(16)140720j Aug. 31, 1984.
Chemical Abstracts 101(6)46221e May 10, 1984.
(List continued on next page.)

Primary Examiner—Gary P. Straub
Assistant Examiner—Timothy C. Vanoy
Attorney, Agent, or Firm—Finnegan, Henderson, Farabow, Garrett & Dunner

[57] ABSTRACT

A process is disclosed for recovering silver sulfide from a spent photographic fixer solution, which contains silver. The process is particularly suited for treating the fixer solution in a manner which enables recycling of the solution giving rise to considerable reduction in cost of fixer solution and reduced environmental pollution. The process comprises introducing a hydrosulfide reagent into the fixer solution, which contains silver, to precipitate silver sulfide while maintaining pH and thiosulfate levels in the fixer to allow for reuse. The precipitate is isolated from the fixer solution to remove silver thereby and hence enable recycling of the fixer solution.

13 Claims, 3 Drawing Sheets

OTHER PUBLICATIONS

Chemical Abstracts 101(4)26712n May 1, 1984.
Chemical Abstracts 100(14)107101u Oct. 1983.
Chemical Abstracts 95(24)211809v Jun. 1981.
W. Kunda et al., "Recovery of Silver From X-ray Film," Jun. 1985.
M. L. Schreiber, "Present Status of Silver Recovery in Motion-Picture Laboratories," Mar., 1965.
R. LaPerle, "The Removal of Metals From Photographic Effluent by Sodium Sulfide Precipitation," SMPTE Journal, vol. 85, Apr. 1976.
D. Branch, "Silver Recovery Methods for Photoprocessing Solutions," Journal of Imaging Technology, vol. 14, pp. 160–166, 1988.

PHOTOGRAPHIC FIXER REGENERATION

This application is a continuation of application Ser. No. 07/641,686, filed Jan. 16, 1991, which is a continuation in part of application Ser. No. 07/514,936, filed Apr. 26, 1990, now abandoned.

FIELD OF THE INVENTION

This invention relates to the use of a hydrosulfide reagent to precipitate silver sulfide ($Ag_2S$) from spent photographic fixer solutions. The reagent provides a source of water soluble hydrosulfide ions ($HS^-$). The reaction of the $HS^-$ with fixer solution containing silver results in precipitation of $Ag_2S$, maintenance of the pH level and regeneration of the thiosulfate in the fixer solution. This enables recycling of the fixer solution.

BACKGROUND OF THE INVENTION

Silver recovery, from the spent fixer solution used to develop various types of photographic films, including black and white, color and X-ray films is done for economic reasons and to prevent the discarding of hazardous waste containing silver or components of a bleach fixer solution. Current technologies for the recovery of silver from the fixer solution include metallic replacement and electrolytic plating. These have the disadvantages of high capital and maintenance costs, inefficient recovery of silver and an inability to recycle the fixer solution.

It is known how to extract silver from aqueous thiosulfate solutions using such materials as aluminum, aluminum alloys, organic phase containing a quaternary ammonium compounds and sulfide ions. In addition, publications describe the regeneration of spent photographic fixing solution using electrolysis. Some methods provide for limited fixer recycling. Representative methods in this area are as follows:

1. Morana, Simon J. "Silver Recovery from Waste Film by Burning", Precious Met. Proc. Int. Precious Met. 1981 pp. 369–377.
2. Kunda, W. and Etsell, T. H. "Recovery of Silver from X-Ray Film", Precious Met, (Proc. 9th Int. Precious Met. Inst. Conf.), 1985 (Pub. 1986), 289–304.
3. Kunda, W. "Processing of Photographic Spent Solution by Chemical Method", Precious Met. (Proc. 7th Int. Precious Met. Conf.) 1983, (Pub. 1984) 185–95.

Photographic processing of various types of photographic films, including black and white, color and X-ray films involves development of the image by decomposition of silver halide crystals to metallic silver and the removal of unused silver halides from the film. For example, during processing about 33⅓% to 40% of the silver remains on the film and the remaining 60% to 66⅔% is washed into the photographic fixer solution. Discarding of the solution is a problem in that the silver is lost and discharged as pollution into the environment. Silver is currently recovered from the fixer solution using a two stage electrolysis followed by either metallic replacement using cartridges filled with iron wires, or ion exchange to remove residual silver. Electrolysis is costly in capital outlay and in operating costs. The silver recovery is low and environmental problems remain from disposal of the effluent solution. Electrolytic plating allows for some fixer recycling, but electroplating causes a lowering of the pH of the fixer solution and consumption of both sulfite ($SO_3^{-2}$) and thiosulfate resulting in a decrease in the fixation rate and the amount of silver that can be stripped from the film.

Previous work has shown that compounds, such as $Na_2S$ and $H_2S$, which dissociate into sulfide ions, are effective reagents for removing silver from solution in a chemical process. Problems with this process involve formation or use of poisonous hydrogen sulfide ($H_2S$) gas and the generation of elemental sulfur.

It is known in the prior art that the silver product can then be converted to metallic silver by heat treatment in an air atmosphere at 600° C. or by dissolution in nitric acid.

A chemical process, which could selectively remove silver from spent fixer solution without destruction of the thiosulfate in solution and which would allow the fixer solution to be reused, would have the advantages of lower costs, ease of operation, and a reduced environmental hazard.

SUMMARY OF THE INVENTION

According to an aspect of the invention, a process is provided for recovering silver sulfide from spent photographic fixer solutions, which contain silver. The process comprises introducing a hydrosulfide reagent, which provides a source of hydrosulfide ions, into the spent fixer solution to precipitate silver sulfide as a non-soluble precipitate. The resultant precipitate is isolated from the spent fixer solution. Sufficient silver is thereby removed from the spent fixer solution and sufficient thiosulfate is regenerated to enable recycling of the fixer solution.

According to another aspect of the invention, the process is particularly suited for treating spent photographic fixer solutions which contain thiosulfate and in particular sodium or ammonium thiosulfate. The hydrosulfide reagent is preferably either sodium, potassium or ammonium hydrosulfide. The hydrosulfide reagent precipitates silver in the form of silver sulfide while maintaining pH and thiosulfate levels in the fixer to allow for reuse.

According to another aspect of the invention, the quantity of hydrosulfide reagent used is less than 1.0 mole per mole of silver in the fixer solution.

DETAILED DESCRIPTION OF THE PREFERRED EMBODIMENTS

Figure 1A:
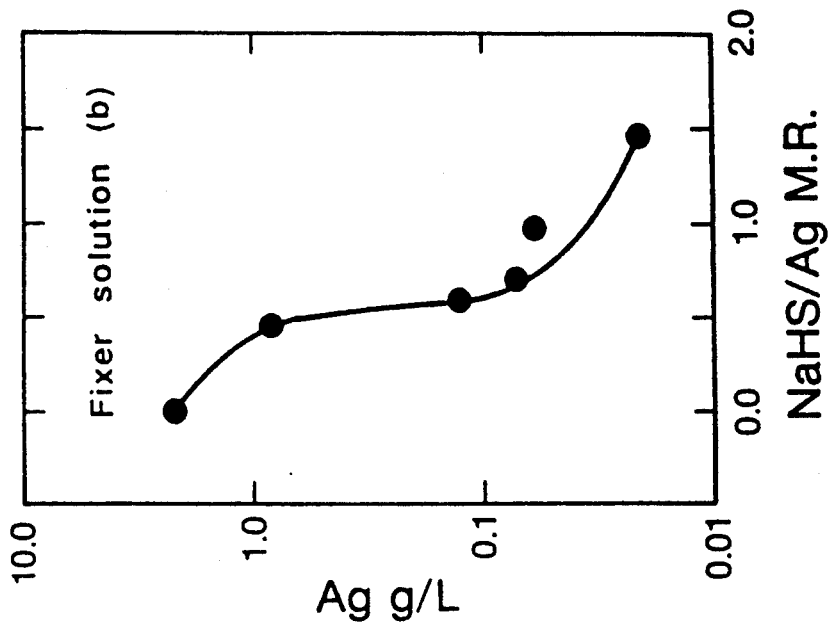
FIGS. 1(a) and 1(b) represent the precipitation of silver from fixer solution using two types of fixer solutions.

The photographic processing of various types of films, including black and white, color and X-ray films involves the development of an image by decomposition of silver halide crystals to metallic silver and the removal of the unused silver halides from the film. Photographic fixer solutions are used in the photographic industry to dissolve the residual silver halide (AgCl, AgBr, or AgI) from the photographic film which is being processed. A variety of photographic fixer solutions have been used over the years. The most common form of photographic fixer solution involves the use of either sodium thiosulfate or ammonium thiosulfate to dissolve the residual silver halide from the film. Other types of photographic fixer solutions are also commonly available. Those solutions include fixer solution used by the oil industry and the bleach-fix and color-fix systems used in the color photographic processing industry. All of these fixer solutions dissolve silver halide from the film. After use, therefore they include silver ions which, in accordance with this invention, may be precipitated from the spent fixer solution by use of the hydrosulfide reagent of this invention. By "spent fixer solution" is meant fixer solution which has been used for fixing film.

With the thiosulfate-types of fixer solutions, for example, sodium thiosulfate and ammonium thiosulfate, which are commonly used in photographic fixer solutions, the time required to clean the film (that is to dissolve residual silver halides) is related to the concentration of available thiosulfate in the fixer solution. The silver halide, as removed from the film forms silver thiosulfate complexes such as $AgNaS_2O_3$ or $AgNH_4 \cdot S_2O_3$, the build up of which delays the clearance time of the film. It is therefore important to remove silver from the fixer solution to ensure sufficient concentration of the uncomplexed thiosulfate to expediently clean the film during the fixing process.

In accordance with this invention, a hydrosulfide reagent, which provides a source of hydrosulfide ions reacts with the various silver thiosulfate complexes to produce silver sulfide without significantly degrading the thiosulfate component of the fixer solution or significantly altering the pH. Examples of such hydrosulfide reagents include: sodium hydrosulfide, potassium hydrosulfide or ammonium hydrosulfide. Hence, the fixer solution as treated in accordance with this invention, may be recycled for use as a fixer solution in the photographic development process. This significantly cuts down on the cost of the fixer solution as well as reducing pollution in the environment. In the prior systems for recovering silver, the spent fixer solution with a portion of the silver removed therefrom had to be discarded because, in the process of recovering the silver, the thiosulfate component was degraded into compounds which could not be recycled.

In accordance with this invention, the hydrosulfide reagent as used to treat the fixer solution is readily available as a concentrate or in its hydrated form. For example, sodium hydrosulfide is available commercially as a 47.5% concentrate solution which can be readily diluted to the desired use solution, such as a two molar solution. Sodium hydrosulfide may also be commercially obtained as a hydrated salt in the form of $NaHS \cdot 0.89 H_2O$. This salt may be dissolved in water to provide the desired concentration of solution such as a two molar solution. Alternatively, the sodium hydrosulfide may be prepared by reacting $H_2S$ gas with sodium hydroxide. Similarly potassium hydrosulfide and ammonium hydrosulfide may be prepared by reacting a solution of potassium hydroxide (KOH) or ammonium hydroxide, respectively with hydrogen sulfide ($H_2S$) gas. In aqueous solution the hydrosulfide reagents will dissociate to provide water soluble hydrosulfide ions.

Although the silver is complexed with the thiosulfate, it is believed that the hydrosulfide ions, in one manner or another, react with the various silver thiosulfate complexes to produce silver sulfide. In this solution, the silver sulfide is not soluble; hence it precipitates and forms a mass which may be easily filtered or readily settles out of solution.

Although the invention is not intended to be limited by any particular theory, it is suggested that an equation which represents the chemical reaction is as follows:

$$2AgNaS_2O_3 + NaHS \rightarrow Ag_2S + Na_2S_2O_3 + NaHS_2O_3$$

The hydrosulfide reagent in this particular equation represented as sodium hydrosulfide preferentially reacts with the silver sodium thiosulfate complex and does not react in any significant way with other components of the fixer solution. Although sodium hydrosulfide will also react with sodium thiosulfate, this reaction is minimized because of the preferential reaction of sodium hydrosulfide with the silver sodium thiosulfate. It has been found that excessive amounts of sodium hydrosulfide, if introduced to the spent fixer solution, will react with the sodium thiosulfate to degrade the thiosulfate to elemental sulfur which is not desirable.

If it is desired to maintain the concentration of the thiosulfate in the fixer solution, particularly for purposes of recycling, it is important to control the quantity of hydrosulfide reagent used in precipitating silver. In accordance with this invention, the use of up to 1 mole of sodium hydrosulfide per one mole of silver in the fixer solution (which can be determined by pretreatment analysis), results in relatively little degradation of the thiosulfate. Amounts of sodium hydrosulfide in excess of one mole results in increasing degradation of the thiosulfate. The preferred range of hydrosulfide reagent in the solution is approximately 0.5 moles to 1.0 moles per mole of silver in the fixer solution.

Other parameters, which can influence the effectiveness of the process, are the rate of introduction of the hydrosulfide reagent to the fixer solution, the degree of agitation of the solution and the pH of the spent fixer solution prior to treatment. It is preferred that the rate of introduction of the hydrosulfide reagent to the spent fixer solution be at a rate which is slow enough, depending upon the conditions, to avoid evolution of $H_2S$ gas. Hence the rate of introduction of the hydrosulfide reagent may vary considerably depending upon the pH of the fixer solution as well as the degree of agitation of the fixer solution. All three of these parameters are related. Normally if the rate of introduction is increased, then correspondingly the degree of agitation of the fixer solution must also be increased. Although for increased rate of agitation, the pH of the solution may inversely be lower. It is therefore appreciated that for a fixer solution having a lower pH, the degree of agitation must correspondingly be higher to avoid evolution of $H_2S$ gas during the addition of the hydrosulfide reagent. Providing the degree of agitation is high enough to avoid formation of pockets of hydrosulfide reagent, the rate of introduction thereof may be correspondingly higher.

It has also been found that to minimize the degradation of the thiosulfate, the fixer solution should preferably be agitated. The degree of agitation contemplated is that produced by a mechanical, ultrasonic or gas bubbling means. Mechanical stirrers, recirculating pumps, ultrasonic stirrers, ultrasonic vibration devices or gas bubbles through the system create sufficient agitation to ensure good mixing of the introduced hydrosulfide with the fixer solution to eliminate any pockets of high concentration of the hydrosulfide reagent and thereby ensure that the preferential reaction with the silver complex proceeds. To avoid the formation of pockets of the high concentration of the hydrosulfide reagent as already noted, the rate of introduction of the reagent is selected to be in step with the degree of agitation. For a high degree of agitation, higher rates of introduction of the hydrosulfide reagent are permissible where the desired degree of agitation can be established by experimentation with a particular fixer solution. For example, in treating a quantity of fixer solution in a reaction vessel which holds approximately 50 liters, the fixer solution may be circulated through the reaction vessel at a rate of approximately 8 liters per minute. This establishes a substantial degree of agitation in the 50 liter reaction vessel. The circulation rate of the fixer solution may be achieved by a suitable pump, such as a diaphragm pump which is not corroded by the fixer solution. The solution may be withdrawn from the bottom of the tank and returned to the side of the tank through a suitable nozzle. The solution may be circulated at pressure of 40 to 60 psi. The nozzle may be approximately one quarter inch in diameter to provide for a high speed injection of the fixer solution into the tank. For this high speed injection of the fixer solution back into the tank, the rate of injection of the hydrosulfide reagent may be in the range of 2 to 3 ml per second. Sufficient hydrosulfide reagent is injected into the tank at this rate until a desired molar ratio of hydrosulfide reagent to silver in the fixer solution is in the range of 0.5 to 1.0. Preferably, the hydrosulfide reagent is injected adjacent the nozzle so that the reagent is swept immediately into the high speed stream of the fixer solution to provide for immediate mixing and avoiding the formation of pockets of high concentration of the reagent. The nozzle may be angled within the vessel to encourage a swirl flow of the fixer solution in the vessel. After injection of the hydrosulfide reagent is completed, the pump continues to run to provide for the necessary agitation into the solution until precipitation of silver from the fixer solution is completed to the desired extent.

In accordance with another aspect of the invention, it is desirable that the pH of the fixer solution should be above about 3.5 to 4.0. When the pH of the fixer solution is below 3.5, formation of hydrogen sulfide gas can be a problem. The formation of the gas can affect the precipitation of silver from the solution and also detracts from the overall efficiency of treating the fixer solution.

Although the above comments have been directed specifically towards the use of sodium hydrosulfide to precipitate silver from a silver sodium thiosulfate complex, the invention contemplates the use of other hydrosulfide reagents i.e. compounds which provide hydrosulfide ion in the fixer solution. Thus, for example potassium hydrosulfide or ammonium hydrosulfide may also be used in treating silver-bearing thiosulfate complexes and sodium hydrosulfide, potassium hydrosulfide or ammonium hydrosulfide may be used in treating silver as it exists in other types of fixer solutions, such as the bleach-fix or color-fix, as used in the color photographic processing industry.

It has been found that the temperature of the fixer solution does not have a direct bearing on the precipitation of silver from the fixer solution. Therefore, for convenience, the process may be carried out at room temperature. The silver precipitate in the form of $Ag_2S$ salt forms readily and has very good settling and filtration characteristics. Hence on a commercial scale, the process is very effective in treating fixer solutions and the use of the hydrosulfide reagent does not degrade to any appreciable extent the thiosulfate in the solution. This permits the treated fixer solution to be recycled readily for reuse in the photographic development process, with minimal make-up of thiosulfate. This prevents significant problems presently encountered with regards to disposal of the spent fixer solution, avoiding pollution problems normally occurring in disposal of the fixer solutions in the standard form of waste treatment systems. Economies are also realized in recovery of silver as a precipitate. These features could not all be effectively accomplished simultaneously with the prior types of treatment.

The silver may be recovered from the precipitate by a number of methods known in the art. For example the precipitate may be calcined at temperatures ranging from 300° C. to 600° C. to convert silver sulfide to silver. Alternatively, the silver can be recovered by dissolving the precipitate in nitric acid, or by using conventional smelting and refining techniques.

In reusing the fixer, it may be necessary to add a small portion of fresh fixer to replenish the fixer prior to recycling.

The following Table 1 provides an analysis of various types of known fixer solutions after use in developing films. In the fixer solutions number 3 and 4, thiosulfate content was not analyzed, because of the special make-up of these fixer solutions.

TABLE 1

PHOTOGRAPHIC SOLUTIONS

| No. | Description | Composition | | |
|---|---|---|---|---|
| | | Ag g/L | pH | $Na_2S_2O_3$ Mole/L |
| 1 | Fixer solution (Kodak)[2] | 2.8 | 5.76 | 0.74 |
| 2 | Fixer solution (DuPont)[3] | 3.1 | 5.13 | 1.28 |
| 3 | Fixer solution used by oil industry | 5.0 | 7.54 | n/a[1] |
| 4 | Bleach fixer (from color photo processing industry) | 1.4 | 8.6 | n/a[1] |

NOTE:
[1] n/a = not analyzed
[2] Fixer solution used for manual operation
[3] Fixer solution used for automatic operation (hospitals)

The following examples illustrate the best modes contemplated for carrying out this invention, but are not to be construed as limiting.

EXAMPLE 1

The fixer solutions of Table 1 were treated in accordance with this invention to precipitate silver sulfide. A 3 molar solution of sodium hydrosulfide was used for treating under various conditions either 1.0 or 17.5 liter charges of the fixer solution. The solutions were measured and charged into a glass jar equipped with a mechanical stirrer. The measured quantity of NaHS reagent was slowly injected into the agitating solution. Within a few minutes the precipitation of $Ag_2S$ was completed. The slurry was stored from 10 minutes to one hour depending upon the precipitation conditions. All reactions were carried out at room temperature. The clear solution was decanted and analyzed for Ag, $Na_2S_2O_3$ and the pH was determined. The silver residue was discharged, filtered and analyzed for content. A summary of the results of these treatments is provided in Table 2.

TABLE 2

Recovery of silver from various photographic spent solutions by precipation with 3M solution of sodium hydrosulphide under preferential conditions.

| Solution No. | Charge | | Head Solution | | Discharge Solution | | | Silver Recovery % | Silver Residue g |
|---|---|---|---|---|---|---|---|---|---|
| | Phot. Sol L | NaHS ml | Ag g/L | $Na_2S_2O_3$ | Ag g/l | $Na_2S_2O_3$ Mole/L | pH | | |
| 1 | 1.0 | 10 | 2.8 | 0.74 | 0.008 | 0.72 | 5.80 | 99.7 | 3.50 |
| 2 | 1.0 | 10 | 3.1 | 1.30 | 0.02 | 1.23 | 5.96 | 99.6 | 6.57 |
| 3 | 17.5 | 311 | 5.0 | n/a | 0.0006 | n/a | 7.80 | 99.9 | 103.5 |
| 4 | 1.0[1] | 10 | 2.0 | n/a | 0.008 | n/a | 7.00 | 99.6 | 3.90 |

NOTE:
[1]Mixture of bleach-fixer and fixer solutions in ratio 1:1

EXAMPLE 2

According to the procedure of Example 1, spent fixer solutions, which usually contain 0.75 moles per liter for manual photographic process development, or 1.3 moles per liter of thiosulfate for automatic photographic processing operation, were treated. Various quantities of NaHS were used to determine the effect on the sodium thiosulfate during precipitation of the silver.

Figure 1B:
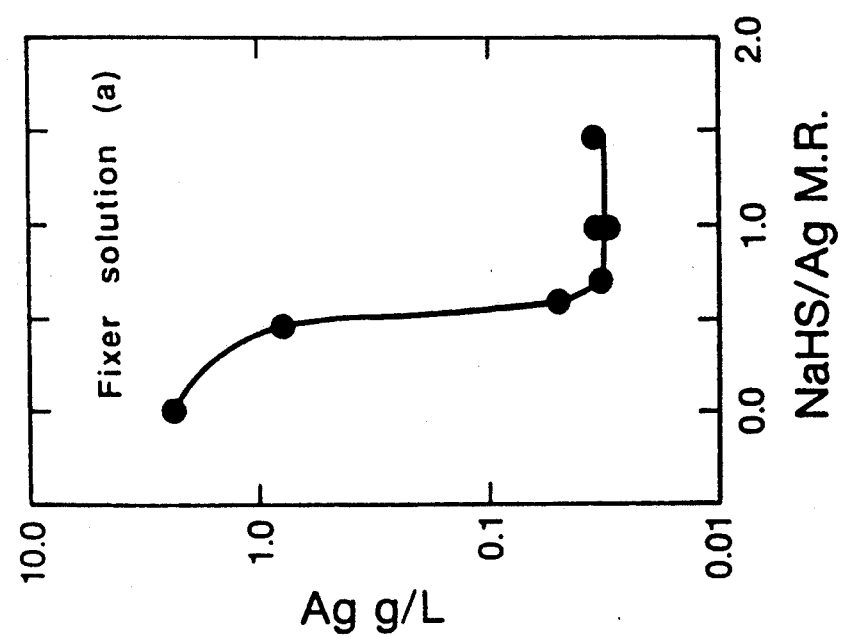
Figure 2B:
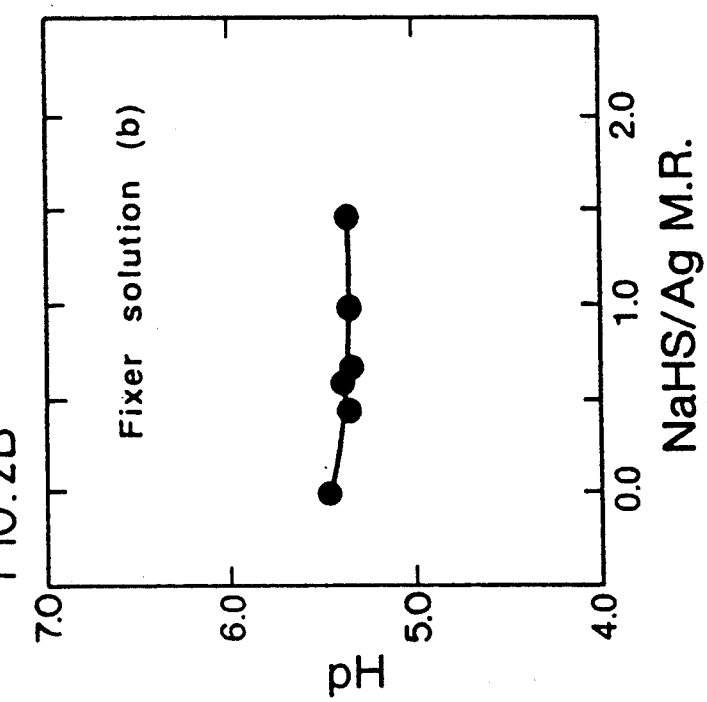
FIGS. 2(a) and 2(b) represent the change in pH using various concentrations of NaHS reagents in the two types of fixer solutions of FIG. 1.
Figure 2A:
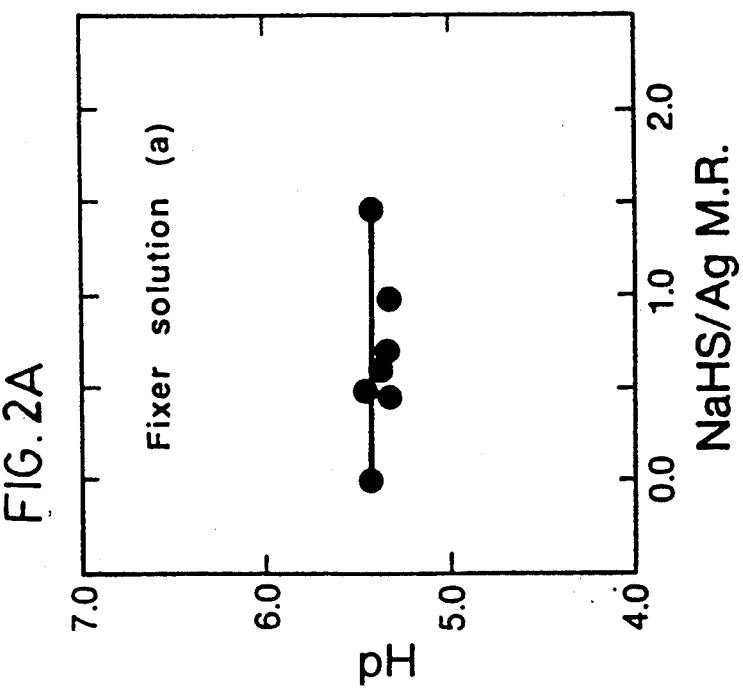
Figure 3B:
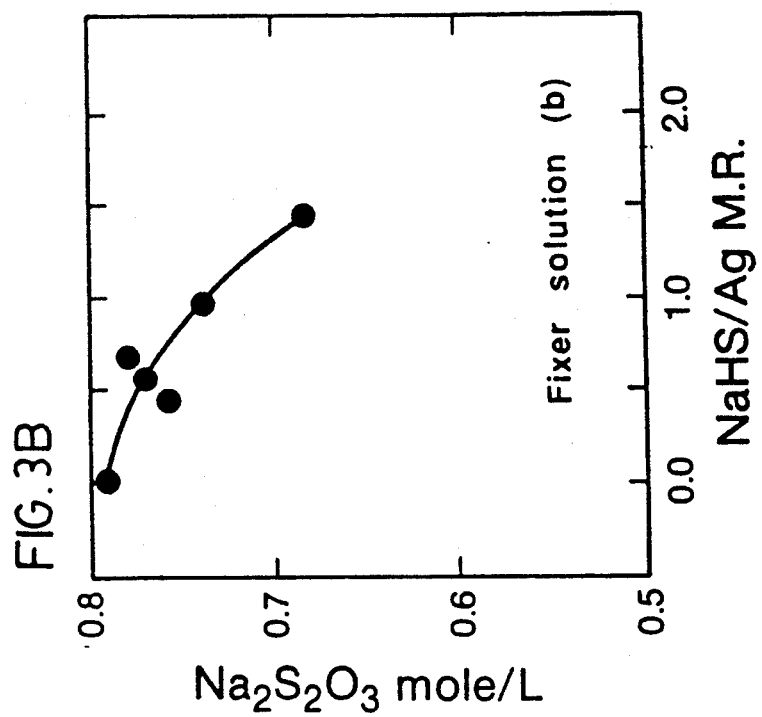
FIGS. 3(a) and 3(b) represent depletion of sodium thiosulfate in fixer solution using various concentrations of NaHS reagents in the two types of fixer solutions of FIG. 1.
Figure 3A:
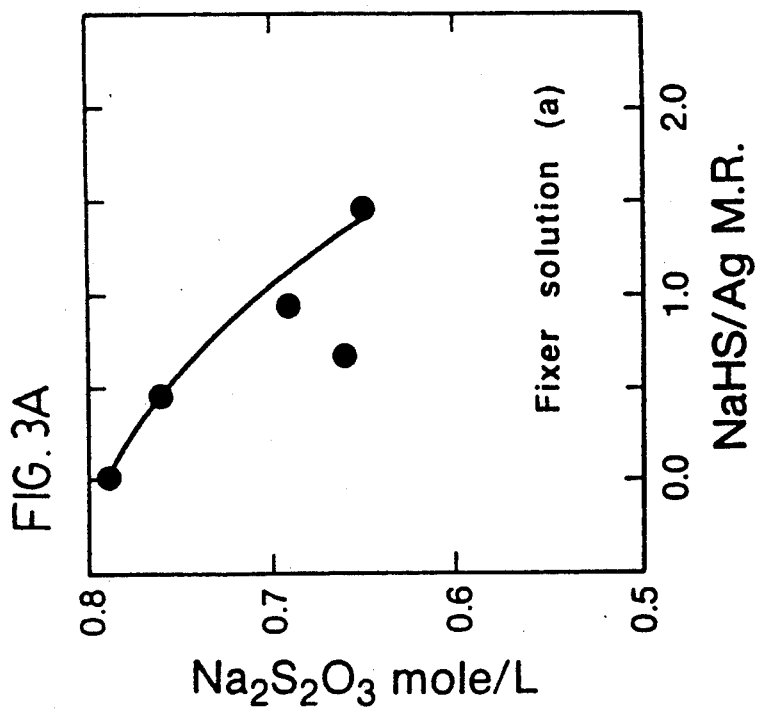

The results of these treatments for a fixer solution containing 0.74 moles per liter of thiosulphate are presented in Table 3. It is apparent that in the filtrate, the concentration of thiosulfate dropped off considerably once the molar ratio of NaHS/Ag exceeded 2 and that when silver in solution decreased below 0.01 grams per liter, the sodium hydrosulfide began to react with the sodium thiosulfate reducing $S_2O_3^{-2}$ to elemental sulfur. The addition, however, of a preferred amount of 0.5 to 1 mole of NaHS per mole of silver in the fixer solution does not appreciably destroy the sodium thiosulfate; hence the fixer solution as treated can be recycled. When the sodium thiosulfate concentration does decrease below the required level, replenishing with fresh fixer or sodium thiosulfate can enhance the operation of the recycled fixer solution.

spent fixer solution and equipped with a mechanical stirrer. Agitation was discontinued and the treated solution was allowed to settle for approximately 10 to 30 minutes. After decantation the thickened slurry was filtered, washed, dried and analyzed by X-ray diffraction to identify the silver compounds. The filtrate was analyzed for silver, pH and sodium thiosulfate ($Na_2S_2O_3$). The results in Table 4 and FIG. 1 show that the most important parameter is the quantity of NaHS reagent. One mole of NaHS will precipitate 2 moles of silver. The destruction of $Na_2S_2O_3$ can be controlled by avoiding an excess of NaHS. Losses of sodium thiosulfate should be replenished to the original composition by the addition of $Na_2S_2O_3$ in the manner previously discussed.

Agitation and the slow introduction of NaHS are preferred aspects of the process since these conditions eliminate the formation of $H_2S$ and decomposition of $Na_2S_2O_3$.

A pH lower than about 3.5 to 4.0 promotes formation of $H_2S$ and causes incomplete precipitation of silver. The various quantities of reagent used all carried out the stripping of silver from silver bearing solution at a pH above 4.0.

The precipitation of silver can be carried out at room temperature.

TABLE 3

Precipitation of silver from spent solution with 3 molar sodium hydrosulfide (NaHS) solution. Effect of $NaHS/AgNaS_2O_3$ molar ratio on recovery of silver and on behavior of $Na_2S_2O_3$.

| Test No. | Charge | | | Filtrate | | | Silver Residue g | Silver Recovery %[2] | Clearing Time sec[3] |
|---|---|---|---|---|---|---|---|---|---|
| | Fixer Sol. (L) | NaHs ml | $NaHS/AgNaS_2O_3$ M.R.[1] | Ag g/L | $Na_2S_2O_3$ mole/L | pH | | | |
| | | | Head Solution | 2.8 | 0.74 | 5.76 | | | |
| 1 | 1.0 | 4 | 0.44 | 0.044 | 0.72 | 5.57 | 2.09 | 98.5 | 3.5 |
| 2 | 1.0 | 10 | 1.15 | 0.008 | 0.72 | 5.80 | 3.50 | 99.7 | 2.6 |
| 3 | 1.0 | 20 | 2.30 | 0.005 | 0.66 | 6.20 | 4.30 | 99.8 | 2.0 |
| 4 | 1.0 | 25 | 2.88 | 0.009 | 0.65 | 6.15 | 4.52 | 99.7 | 5.0 |
| 5 | 1.0 | 30 | 3.46 | 0.004 | 0.64 | 6.59 | 5.91 | 99.9 | 8.0 |

NOTE:
[1]M.R. - molar ratio.
[2]Silver recovery calculated on solution basis
[3]Time (sec.) for removal of silver halide from the film

EXAMPLE 3

Various quantities of 2 molar NaHS solutions were slowly injected into jars each filled with 1 liter each of

TABLE 4

Stripping of silver from Fixer Solution with NaHS
Head Materials:
1. Fixer solution: Ag = 2.2 g/L (0.204 mole/L); pH = 5.43; $Na_2S_2O_3$ = 0.79 moles/L
2. Stripping reagent: (a) 47.5% NaHS diluted with water to 2M concentration.
(b) NaHS 0.89 $H_2O$ salt dissolved to 2M concentration.

| Test No. | Charge | | | Filtrate | | | Residue | | | |
|---|---|---|---|---|---|---|---|---|---|---|
| | Fixer L | $NaHS^1$ ml | mol/L | $Ag^3$ g/L | pH | $Na_2S_2O_3$ mole/L | NaHS/Ag M.R. | Weight g | $Ag^2$ g | X-ray Analysis |
| 1 | 1.0 | 5 | 0.010 | 0.810 | 5.46 | 0.76 | 0.49 | 1.59 | 1.39 | $Ag_2S$ |

TABLE 4-continued

Stripping of silver from Fixer Solution with NaHS
Head Materials:
1. Fixer solution: Ag = 2.2 g/L (0.204 mole/L); pH = 5.43; $Na_2S_2O_3$ = 0.79 moles/L
2. Stripping reagent: (a) 47.5% NaHS diluted with water to 2M concentration.
 (b) NaHS 0.89 $H_2O$ salt dissolved to 2M concentration.

| Test No. | Charge Fixer L | Charge NaHS[1] ml | Charge NaHS[1] mol/L | Filtrate $Ag^{[3]}$ g/L | Filtrate pH | Filtrate $Na_2S_2O_3$ mole/L | Residue NaHS/Ag M.R. | Residue Weight g | Residue $Ag^{[2]}$ g | Residue X-ray Analysis |
|---|---|---|---|---|---|---|---|---|---|---|
| 2 | 1.0 | 6 | 0.012 | 0.052 | 5.34 | 0.72 | 0.59 | 2.48 | 2.15 | $Ag_2S$ |
| 3 | 1.0 | 7 | 0.014 | 0.033 | 5.33 | 0.66 | 0.69 | 2.54 | 2.23 | $Ag_2S$ |
| 4 | 1.0 | 10 | 0.020 | 0.033 | 5.31 | 0.69 | 0.98 | 2.49 | 2.17 | $Ag_2S$ |
| 5 | 1.0 | 15 | 0.030 | 0.038 | 5.46 | 0.65 | 1.47 | 2.49 | 2.17 | $Ag_2S$ |
| 6 | 1.0 | 5 | 0.010 | 0.840 | 5.36 | 0.76 | 0.49 | 1.15 | 1.38 | $Ag_2S$ |
| 7 | 1.0 | 6 | 0.012 | 0.107 | 5.38 | 0.77 | 0.59 | 1.75 | 1.52 | $Ag_2S$ |
| 8 | 1.0 | 7 | 0.014 | 0.074 | 5.36 | 0.78 | 0.69 | 2.00 | 1.74 | $Ag_2S$ |
| 9 | 1.0 | 10 | 0.020 | 0.065 | 5.34 | 0.74 | 0.98 | 2.55 | 2.22 | $Ag_2S$ |
| 10 | 1.0 | 15 | 0.030 | 0.021 | 5.37 | 0.68 | 1.47 | 2.40 | 2.08 | $Ag_2S$ |

NOTE:
[1] Stripping agents (a) used in Test Nos. 1 to 5 and (b) in Test Nos. 6 to 10.
[2] Silver in residue was calculated assuming that the residue is composed of $Ag_2S$ containing 87.06% silver
[3] Silver fixer solution was analysed by A.A. Spectrophotometry

EXAMPLE 4

Spent fixer solutions containing:
a) 0.7 molar sodium thiosulfate, or
b) 0.7 molar sodium thiosulfate and 0.35 molar ammonium thiosulfate
were treated with sodium hydrosulfide as outlined in Table 5. The results of these treatments are shown in Table 5.

TABLE 5

| Test No. | Fixer ml a | Fixer ml b | NaHS ml | NaHS $NaHS/AgNaS_2O_3$ M.R. | Filtrate Ag (g/L) | Filtrate pH |
|---|---|---|---|---|---|---|
|   |   |   |   |   | Head 3.0 | 5.5 |
| 1 | 1,000 |       | 7  | 0.5  | 0.060 | 5.4 |
|   |       | 1,000 | 7  | 0.5  | 0.040 | 5.4 |
| 2 | 1,000 |       | 30 | 2.13 | 0.004 | 6.2 |
|   |       | 1,000 | 30 | 2.13 | 0.002 | 6.2 |

EXAMPLE 5

A 2 molar solution of potassium hydroxide (KOH) was prepared by dissolving 112.22 g of KOH in 1 liter of water. The pH of the KOH solution was 13.6. Hydrogen sulfide ($H_2S$) gas was slowly injected into the KOH solution until the pH started to decrease to about 8. The poisonous and unpleasant smell of $H_2S$ gas was avoided by adding no more than one mole of $H_2S$ per mole of KOH. The $H_2S$ gas reacted with the KOH to form potassium hydrosulfide according to the reaction:

$$KOH + H_2S \rightarrow KHS + H_2S$$

The potassium hydrosulfide (KHS) solution was used for precipitation of the silver from fixer solution. Three glass jars were each filled with 1 liter of fixer solution. The KHS solution was injected into the three jars in different quantities: 5 ml, 10 ml and 15 ml, respectively. Silver precipitated immediately from fixer solution in all three jars. The settling of solids with 5 ml reagent was very slow, with 15 ml was intermediately slow, and with 10 ml was very fast (approximately 5 minutes). The results of the treatment of fixer solution with the potassium hydroxide reagent are shown in Table 6.

These results show that the KHS reagent also provides hydrosulfide ions, which can be used according to the present invention.

TABLE 6

Stripping of Silver from Fixer Solution using Potassium Hydrosulfide

| Test No. | Charge Fixer ml | Charge KHS ml | Fixer Solution $KHS/AgNaS_2O_3$ M.R. | Fixer Solution Ag g/l | Fixer Solution $S_2O_3$ mole | Fixer Solution pH | $Ag_2S$ Residue Wt g | $Ag_2S$ Residue X-ray | $Ag_2S$ Residue EDA* |
|---|---|---|---|---|---|---|---|---|---|
| 1 | 1,000 | 5  | 0.4 | 0.710 | 0.75 | 4.6  | 2.4 | $Ag_2S$ | Ag, S |
| 2 | 1,000 | 10 | 0.8 | 0.066 | 0.75 | 4.7  | 3.4 | $Ag_2S$ | Ag, S |
| 3 | 1,000 | 15 | 1.2 | 0.052 | 0.75 | 4.48 | 4.3 | $Ag_2S$ | Ag, S |
|   | Fixer-head |  |    | 2.8   | 0.75 | 4.85 | —   |         |       |

*Energy Dispersive Analysis

Although preferred embodiments of the invention are described herein in detail, it will be understood by those skilled in the art that variations may be made thereto without departing from the spirit of the invention or the scope of the appended claims.

We claim:

1. In a process for treating used, photographic fixer solution containing dissolved silver by the addition of a chemical reagent thereto, the improvement comprising,
(a) using as the chemical reagent a hydrosulfide reagent which provides hydrosulfide ions in an amount ranging from 0.5 to 1.0 mole of hydrosulfide ions per mole of dissolved silver so that dissolved silver is precipitated therefrom as a silver containing compound,
(b) removing the precipitated silver containing compound,
(c) with the proviso that during steps (a) and (b) the hydrosulfide reagent precipitates dissolved silver without significantly altering the pH of the fixer solution, so that the resultant treated fixer solution is suitable for reuse as a photographic fixer solution in a process for fixing photographic film.

2. In a process of claim 1, the used fixer solution is a sodium thiosulfate fixer solution.

3. In a process of claim 1, the used fixer solution is an ammonium thiosulfate fixer solution.

4. In a process of claim 1, the hydrosulfide reagent is selected from the group consisting of sodium hydrosulfide, potassium hydrosulfide and ammonium hydrosulfide.

5. In a process of claim 1, physical losses of said fixer solution are replaced by adding fresh fixer solution thereto.

6. In a process of claim 1, the pH is maintained above 3.5.

7. In a process of claim 1, the pH is maintained above 4.0.

8. In a process of claim 1, the pH is maintained above 5.0.

9. In a process of claim 2, the pH is maintained above 5.0 and less than 7.0.

10. In a process of claim 9, the hydrosulfide reagent is sodium hydrosulfide.

11. In a process of claim 10, the used fixer solution comprises an amount of sodium thiolsulfate ranging from 0.74 to 0.79 moles per liter.

12. In a process of claim 1, the used fixer solution contains thiosulfate, which thiosulfate is maintained at a level sufficient to allow for reuse of the photographic fixer solution.

13. In a process for treating used, photographic fixer solution having a pH of about 3.5 to 7.0 and containing from 0.74 to 1.3 moles of spent alkali thiosulfate therein and containing dissolved silver by the addition of a chemical reagent thereto, the improvement comprising,
   a. mixing said used fixer solution with an aqueous solution of hydrosulfide that provides 0.5 to 1.0 moles of hydrosulfide ions per mole of dissolved silver, whereby said dissolved silver is converted to a precipitate of silver sulfide;
   b. removing said silver sulfide by filtration; and
   c. recovering said fixer solution in a condition suitable for reuse as a photographic fixer in a process for fixing photographic film, wherein the pH of said solution is not significantly altered by said process.

* * * * *